(12) United States Patent
Hecht

(10) Patent No.: US 6,565,292 B2
(45) Date of Patent: May 20, 2003

(54) CUTTING TOOL

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 23 days.

(21) Appl. No.: 10/012,332

(22) Filed: Dec. 12, 2001

(65) Prior Publication Data
US 2002/0081165 A1 Jun. 27, 2002

(30) Foreign Application Priority Data
Dec. 27, 2000 (IL) .................................................. 140593

(51) Int. Cl.$^7$ ............................ B23B 27/04; B23P 15/28
(52) U.S. Cl. ....................................... 407/110; 407/117
(58) Field of Search ................................ 407/110, 117

(56) References Cited
U.S. PATENT DOCUMENTS 3,523,349 A * 8/1970 Pollington et al. ............ 407/68
3,785,021 A   1/1974 Norgren ........................ 29/96
3,887,975 A * 6/1975 Sorice et al. .................. 407/47
4,443,136 A * 4/1984 Kemmer ....................... 407/72
4,580,930 A   4/1986 Zinner ......................... 407/110
4,992,007 A * 2/1991 Satran ......................... 407/110
5,059,068 A  10/1991 Scott ............................. 407/9

* cited by examiner

Primary Examiner—Daniel W. Howell
Assistant Examiner—Brian D Walsh
(74) Attorney, Agent, or Firm—Pennie & Edmonds LLP

(57) ABSTRACT

A cutting tool has a cutting insert resiliently clamped in an insert pocket. The cutting insert has an abutment surface in the form of a circular segment protruding from a bottom face. The insert pocket has a base jaw with an abutment surface in the form of a circular arc in which the circular segment is received. As a consequence, the cutting insert cannot be removed by sliding it forwardly in the insert pocket.

6 Claims, 5 Drawing Sheets

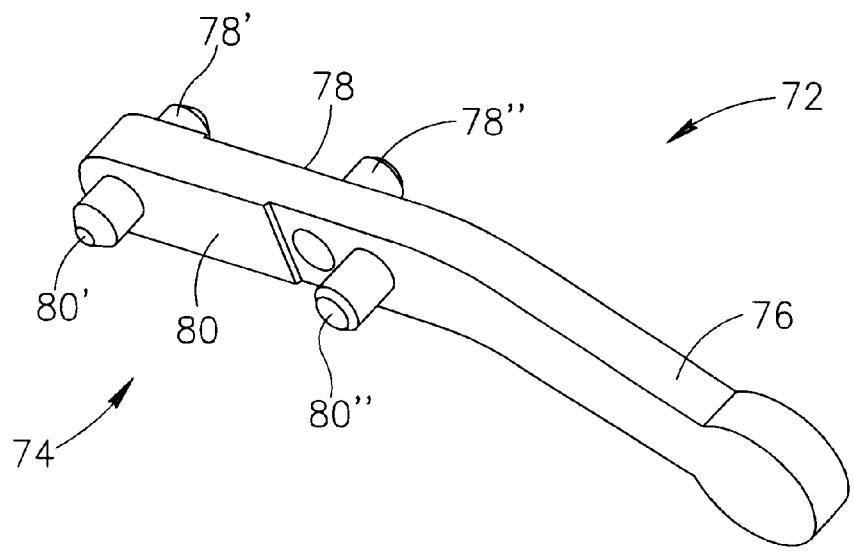
FIG.5
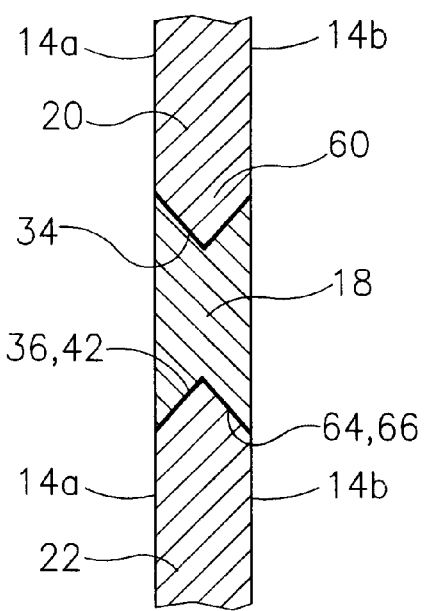
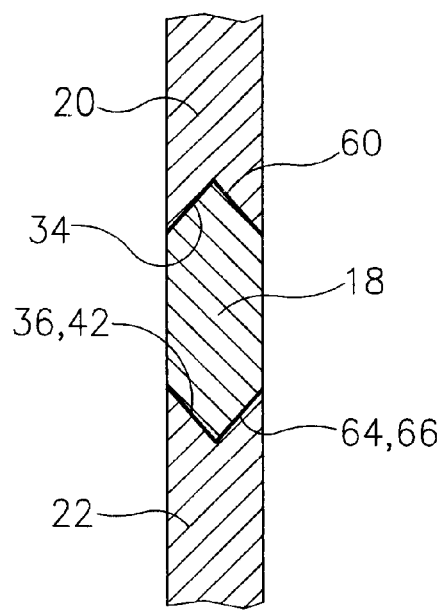
FIG.6A        FIG.6B

US 6,565,292 B2

CUTTING TOOL

FIELD OF THE INVENTION

This invention relates to a cutting tool having a resilient clamping mechanism and a replaceable insert retention member.

BACKGROUND OF THE INVENTION

Cutting tools employing a resilient clamping mechanism for clamping cutting inserts are generally of relatively narrow thickness. For example, cutting operations such as grooving and parting off can be performed by a cutting insert retained in an insert pocket located between the clamping surfaces of upper and lower jaws of a relatively narrow holder blade. The holder blade is, in turn, generally clamped in a blade-retaining block. The holder blade is generally provided with a suitably designed opening, in the vicinity of the insert pocket whereby a relatively narrow bridging portion is formed enabling a limited degree of resilient displacement of one of the holder blade's jaws relative to the other. Generally, the lower jaw is rigid and the upper jaw is resiliently displaceable. The opening can be of the form of an aperture, or a slot, or a slot terminating in an aperture. Examples of such cutting tools are disclosed in U.S. Pat. No. 3,785,021 and U.S. Pat. No. 4,580,930. A rotary slot-cutting tool employing a resilient insert clamping mechanism is disclosed in U.S. Pat. No. 5,059,068. The cutter body is disc-shaped and of relatively narrow thickness, with cutting insert pockets located around its periphery. As with the holder blade, an insert pocket of a rotary slot-cutting tool has two jaws between which an insert is clamped by means of the resilient force resulting from the bending of the clamping jaw.

Whether the cutting tool is a holder blade or a rotary slot cutting tool, the bending of the clamping jaw is obtained by manufacturing the insert pocket so that the distance between the clamping surfaces of the jaws is smaller than the height of the portion of the insert located between the clamping surfaces. Consequently, when an insert is located in the insert pocket, the clamping jaw is held in a bent position creating an elastic force by means of which the insert is clamped in position.

A well-known problem with cutting tools of the type described above is that the cutting insert is not positively secured in the insert pocket and therefore can become dislodged during cutting operations. For example, this can happen during slotting operations when attempting to withdraw the holder blade from a workpiece. In some cases the cutting insert can be completely pulled out of the holder blade and become embedded in the workpiece. This problem can be especially troubling with rotary slot-cutting tools where the cutting insert can even fly out of the insert pocket under the influence of centrifugal forces. A situation that can be particularly dangerous when operating at high speeds.

It is an object of the present invention to provide a cutting tool with a resilient clamping mechanism in which the above referred to disadvantage is substantially reduced or overcome.

SUMMARY OF THE INVENTION

In accordance with the present invention there is provided a cutting tool comprising a body portion and at least one cutting portion, the at least one cutting portion comprising an insert pocket and a cutting insert removably retained therein;

the insert pocket being defined between a clamping jaw and a base jaw, the clamping jaw resiliently connected to the base jaw at a rear portion of the insert pocket; the insert pocket having an insert pocket opening at a front end thereof, the clamping jaw having a first upper side and a first lower side, the first lower side opposing the base jaw and being provided with a forward clamping surface proximate to the front end, the base jaw having a second upper side and a second lower side, the second upper side opposing the clamping jaw and comprising a generally straight first abutment surface proximate the front end connected to a second abutment surface having the form of a circular arc and forming a first recess in the base jaw relative to the first abutment surface;

the cutting insert comprising front and top faces that define a cutting edge at an intersection thereof, and a bottom face located between the front face and a rear face, the top face having a rake surface adjacent the cutting edge and a second abutment surface adjacent the rear face, the bottom face comprises a generally straight third abutment surface adjacent the front face and a fourth abutment surface adjacent the rear face, at least a portion of the fourth abutment surface having the form of a circular segment protruding from the cutting insert relative to the third abutment surface; wherein the first and second abutment surfaces abut the third and fourth abutment surfaces, respectively, and the clamping surface abuts the second abutment surface.

Preferably, a first aperture is formed between the rear face of the cutting insert and the rear portion of the insert pocket.

Further preferably, a throughgoing second aperture is formed in the base jaw.

In accordance with the present invention, there is also provided a method for inserting and clamping a cutting insert in an insert pocket, the insert pocket being defined between a clamping jaw and a base jaw, the clamping jaw resiliently connected to the base jaw at a rear portion of the insert pocket; the insert pocket having an insert pocket opening at a front end thereof, the clamping jaw having a first upper side and a first lower side, the first lower side opposing the base jaw and being provided with a forward clamping surface proximate to the front end, the base jaw having a second upper side and a second lower side, the second upper side opposing the clamping jaw and comprising a generally straight first abutment surface proximate the front end connected to a second abutment surface having the form of a circular arc and forming a first recess in the base jaw relative to the first abutment surface, the second abutment surface being located on a circle with a given center;

the cutting insert comprising front and top faces that define a cutting edge at an intersection thereof, and a bottom face located between the front face and a rear face, the top face having a rake surface adjacent the cutting edge and a second abutment surface adjacent the rear face, the bottom face comprises a generally straight third abutment surface adjacent the front face and a fourth abutment surface adjacent the rear face, at least a portion of the fourth abutment surface having the form of a circular segment protruding from the cutting insert relative to the third abutment surface;

the method comprising the steps of:
  (i) partially inserting the cutting insert in the insert pocket from a side of the insert pocket by placing the fourth abutment of the bottom face of the cutting insert on the second abutment surface of the second upper side of the base jaw on an abutment region so that partial abutment is obtained between the fourth abutment surface and the second abutment surface, with the top face of the cutting insert located outside the insert pocket;

(ii) rotating the cutting insert about the abutment region into the insert pocket until the top face of the cutting insert is located inside the insert pocket, and the second abutment surface of the top face of the cutting insert is situated opposite the first lower side of the clamping jaw with the clamping surface of the first lower side of the clamping jaw located opposite the rear portion of the rake surface;

(iii) rotating the cutting insert in the insert pocket about the center of the circle on which the second abutment surface is located until the cutting insert is clamped in position with the third abutment surface of the bottom face of the cutting insert abutting the first abutment surface of the second upper side of the base jaw, the central portion of the fourth abutment surface of the bottom face of the cutting insert abutting the second abutment surface of the second upper side of the base jaw and the clamping surface of the first lower side of the clamping jaw abutting the second abutment surface of the top face of the cutting insert.

BRIEF DESCRIPTION OF THE DRAWINGS

For a better understanding the invention will now be described, by way of example only, with reference to the accompanying drawings in which:

FIG. 5 shows a key for inserting and removing a cutting insert in accordance with the present invention;

FIG. 6A is a partial cross sectional view of the cutting tool of FIG. 2B taken along the line VIA, showing the mechanism for preventing lateral movement of an insert having concave V-shaped cross-sectional surfaces;

FIG. 6B is similar to FIG. 3A but for an insert having convex V-shaped cross-sectional surfaces;

DETAILED DESCRIPTION OF THE PREFERRED EMBODIMENTS

Figure 1:
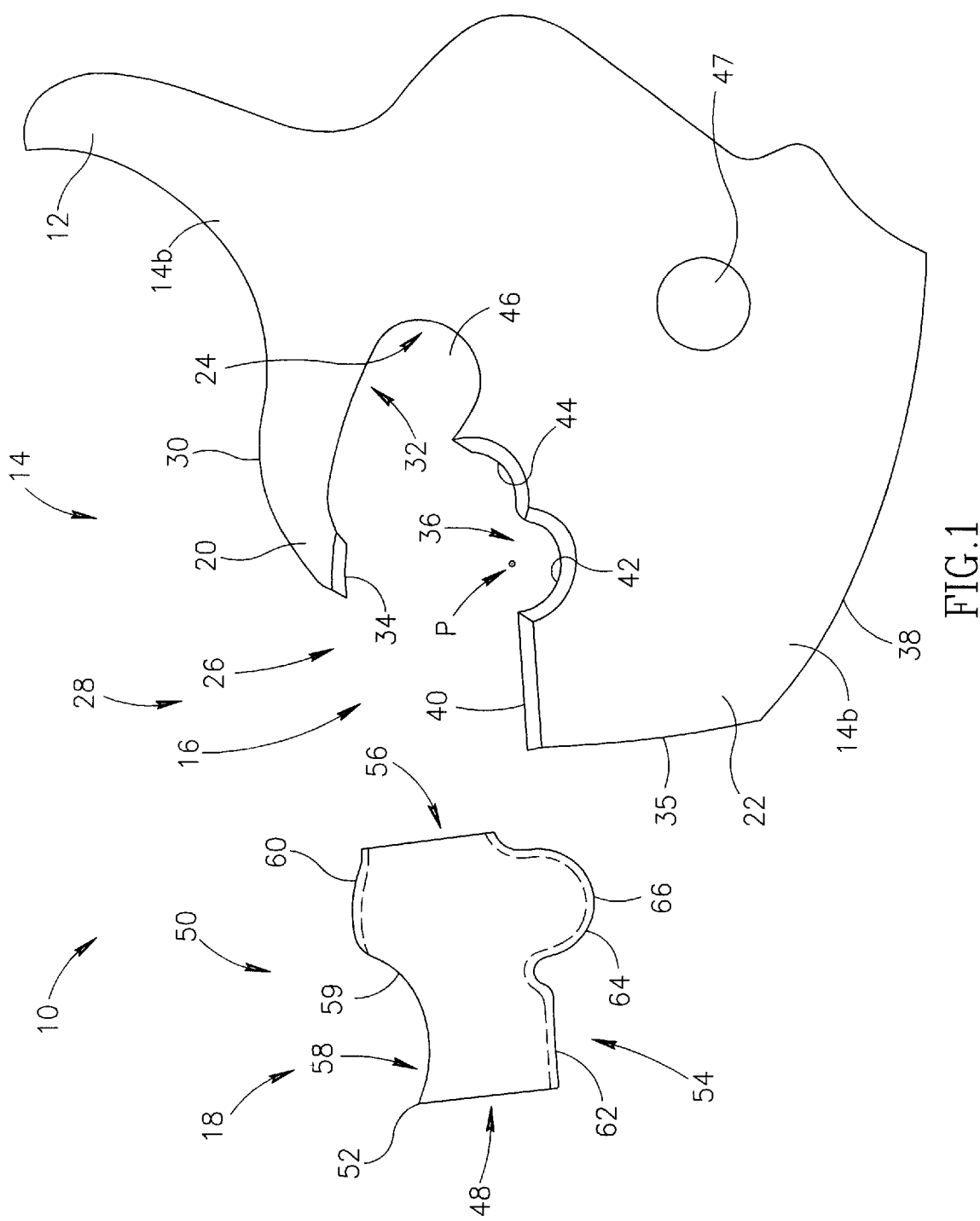
FIG. 1 is an exploded partial side view of a cutting tool in accordance with the present invention, comprising a cutting portion and a first embodiment of a cutting insert.

Attention is first drawn to FIG. 1. A cutting tool 10 comprises a tool body portion 12 and a cutting portion 14 having an insert pocket 16 for retaining a cutting insert 18. The cutting tool is generally used for metal machining and the cutting insert 18 is preferably, but not necessarily, made of cemented carbide such as, for example, tungsten carbide. Such a cutting insert is typically made by a pressing and sintering process. If desired, the cutting insert can also be ground. In the following description and claims the directional terms are defined with reference with the orientation of the cutting portion 14 and cutting insert 18 as shown in FIG. 1. A portion of a member to the left in this figure will be referred to as a forward (or front) portion of the member, whereas a portion of a member to the right in this figure will be referred to as a rear (or end) portion of the member. Similarly, portions of a member to the top and bottom in this figure refer, respectively, to upper and lower portions of the member.

The cutting portion 14 has a substantially planar form with generally planar and parallel side surfaces 14a, 14b (see FIG. 6a). The insert pocket 16 is defined between a clamping jaw 20 and a rigid base jaw 22, the clamping jaw 20 being integrally and resiliently connected to the base jaw 22 at a rear portion 24 of the insert pocket 16. The insert pocket 16 has an insert pocket opening 26 at a front end 28 of the insert pocket 16. The clamping jaw 20 has a first upper side 30 and a first lower side 32, the first lower side 32 opposing the base jaw 22 and being provided with a forward clamping surface 34 proximate to the front end 28 of the insert pocket 16. The base jaw 22 has a front side 35 situated between a second upper side 36 and a second lower side 38. The second upper side 36 opposes the clamping jaw 20 and comprises a generally straight first abutment surface 40, proximate the front end 28 of the insert pocket 16, connected to a second abutment surface 42 having the form of a circular arc located on a circle with center P. The second abutment surface 42 forms a first recess in the base jaw 22. The second abutment surface 42 is recessed relative to the first abutment surface 40. Rearward of the second abutment surface 42 is a concave surface 44 and rearward of the concave surface 44 is a first aperture 46 which is adjacent the rear portion 24 of the insert pocket 16. In the base jaw 22 there is formed a throughgoing second aperture 47.

Figure 2:
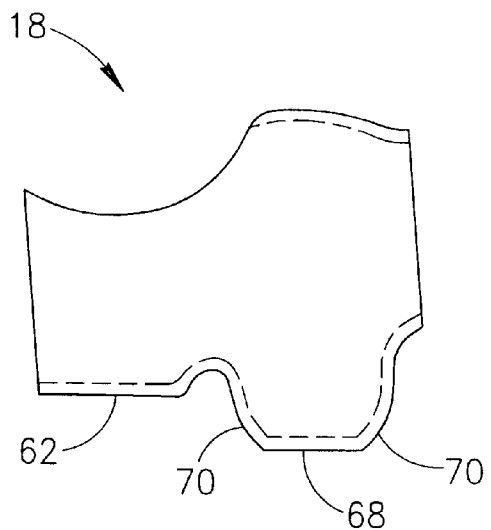
FIG. 2 is a side view of a second embodiment of a cutting insert.

The cutting insert 18 comprises a front face 48 and a top face 50 that intersect at a cutting edge 52, and a bottom face 54 located between the front face 48 and a rear face 56. The top face 50 has a rake surface 58 extending generally rearwardly from the cutting edge 52 to a second abutment surface 60 adjacent the rear face 56 of the cutting insert 18. The rake surface 58 has a rear portion 59 proximate to the second abutment surface 60. The bottom face 54 comprises a generally straight third abutment surface 62 adjacent the front surface 48 of the cutting insert 18 and a fourth abutment surface 64 adjacent the rear surface 56. The fourth abutment surface 64 is generally curved in form and protrudes from the cutting insert 18 relative to the third abutment surface 62. A central portion 66 of the fourth abutment surface 64 has the form of a circular segment located on a circle with center Q. In FIG. 2 a second embodiment of the cutting insert 18 is shown. In accordance with the second embodiment, a the central portion 66 has a flat section 68 located substantially centrally with respect to the central portion 66, so that two circular abutment segments 70 are formed on either side of the flat section 68. Therefore, in general, at least a portion of the fourth abutment surface 64 has the form of a circular segment protruding from the cutting insert relative to the third abutment surface.

Figure 3:
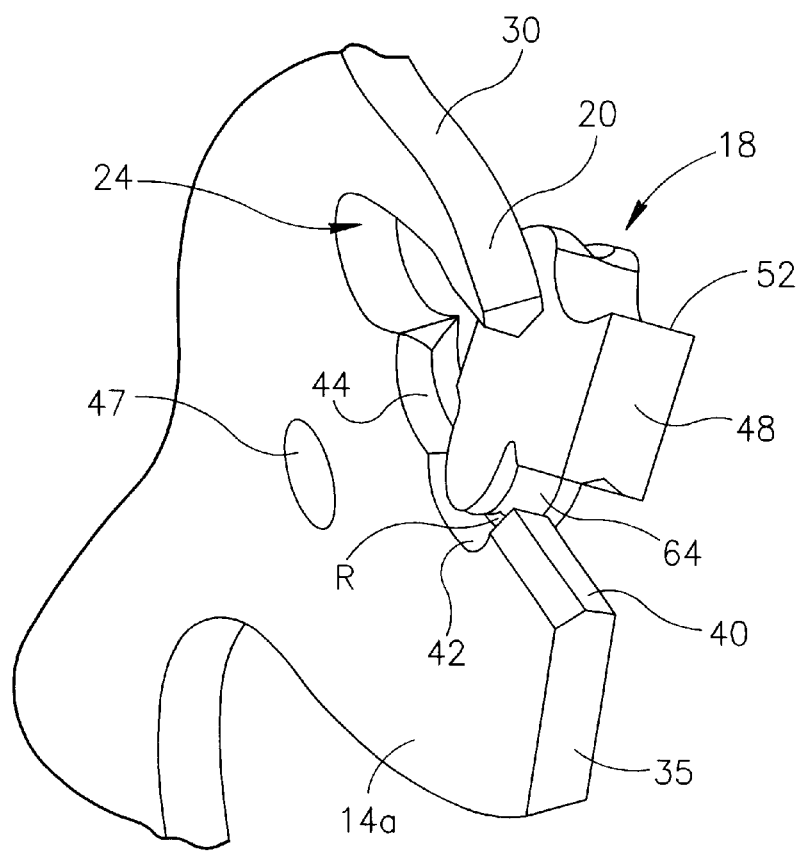
FIG. 3 is an exploded partial perspective view of the cutting tool in accordance with the present invention, showing the cutting insert partially mounted in the insert pocket.
Figure 4A:
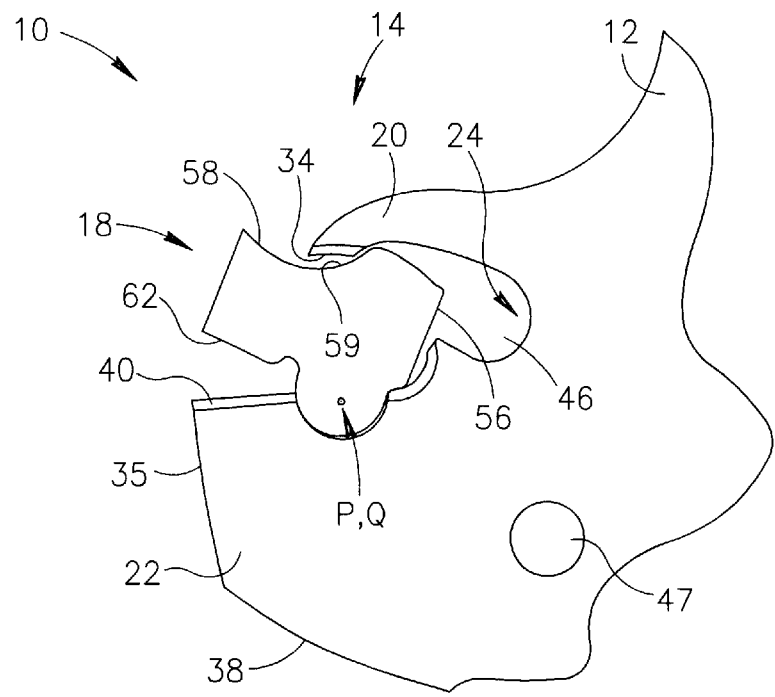
FIG. 4A is a partial side view of the cutting tool in accordance with the present invention, showing the cutting insert mounted in a non-clamped position in the insert pocket.
Figure 4B:
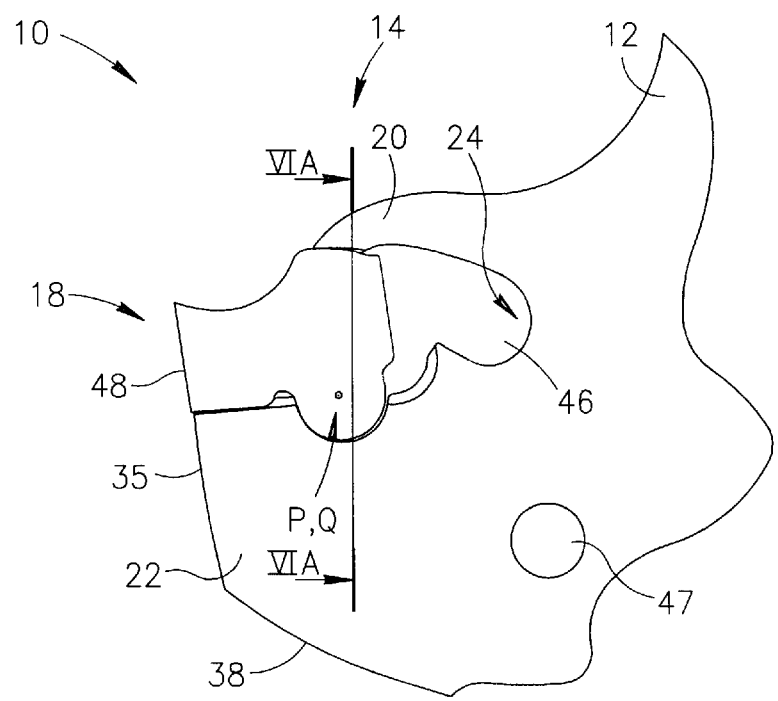
FIG. 4B is a side view of the cutting tool in accordance with the present invention, showing the cutting insert mounted in the clamped position in the insert pocket.

Attention is now drawn to FIGS. 3, 4A and 4B which illustrate the steps involved in mounting the cutting insert 18 in the insert pocket 16. It will be appreciated that in order to ensure resilient clamping of the cutting insert 18, the distance between the clamping surface 34 of the first lower side 32 of the clamping jaw 20 and the second abutment surface 42 of the second upper side 36 of the base jaw 22, without the cutting insert inserted in the insert pocket 16, must be less than the distance between the second abutment surface 60 of the top face 50 of the cutting insert and the central portion 66 of the fourth abutment surface 64. When this condition is fulfilled and when the cutting insert 18 is forceably inserted into the insert pocket 16, the clamping jaw 20 and the base jaw 22 will be forced apart from each other, resulting in a resilient clamping force which the clamping jaw 20 exerts on the cutting insert 18.

Due to the presence of the protruding fourth abutment surface 64, the cutting insert 18 cannot be inserted into the insert pocket 16 by sliding it rearwardly through the insert pocket opening 26. It will be appreciated that as a direct consequence, the cutting insert cannot be removed from the insert pocket 16 by sliding it forwardly towards the pocket opening 26. Therefore, the cutting insert 18 cannot be easily removed from the insert pocket 16. In order to insert the cutting insert 18 in the insert pocket 16 a three-step process is required. In the first step the cutting insert 18 is partially inserted into the insert pocket 16 from a side of the insert pocket 16, as shown in FIG. 3, by holding the cutting insert at an angle to the planar side surfaces 14a, 14b of the cutting portion 14, with the top face 50 of the cutting insert 18 located outside the insert pocket 16, and with the fourth abutment 64 of the bottom face 54 of the cutting insert 18 placed on the second abutment surface 42 of the second upper side 36 of the base jaw 22 so that partial abutment is obtained between the fourth abutment surface 64 and the second abutment surface 42 along an abutment region R.

In the second step the cutting insert 18 is rotated about the abutment region R into the insert pocket 16 until the angle between the cutting insert and the planar side surfaces 14a, 14b of the cutting portion 14 is reduced to zero, so that the top face 50 of the cutting insert 18 located inside the insert pocket 16 with the second abutment surface 60 of the top face 50 of the cutting insert 18 situated opposite the first lower side 32 of the clamping jaw 20 and the clamping surface 34 of the first lower side 32 of the clamping jaw 20 located opposite the rear portion 59 of the rake surface 58. The cutting insert 18 is now located, in an unclamped position, fully within the cutting insert pocket 16 as shown in FIG. 4A with the center P of the circle on which the second abutment surface 42 is located coinciding with the center Q of the circle on which the fourth abutment surface 64 of the bottom face 54 of the cutting insert 18 is located. In the third and final step, the cutting insert is rotated in the insert pocket 16 about the center P of the circle on which the second abutment surface 42 is located until it is resiliently clamped in the insert pocket 16 in the final clamped position, with the third abutment surface 62 of the bottom face 54 of the cutting insert 18 abutting the first abutment surface of the second upper side of the base jaw 22, the central portion 66 of the fourth abutment surface 64 of the bottom face 54 of the cutting insert 18 abutting the second abutment surface 42 of the second upper side 36 of the base jaw 22 and the clamping surface 34 of the first lower side 32 of the clamping jaw 20 abutting the second abutment surface 60 of the top face 50 of the cutting insert 18.

In order to remove the cutting insert 18 from the insert pocket 16 the above three steps are carried out in reverse. That is, staring off with the situation as shown in FIG. 4B, with the insert in the final clamped position, the cutting insert is rotated in the insert pocket 16 about the center P of the circle on which the second abutment surface 42 is located until it reaches the unclamped position shown in FIG. 4A with the second abutment surface 60 of the top face 50 of the cutting insert 18 situated opposite the first lower side 32 of the clamping jaw 20 and with the clamping surface 34 of the first lower side 32 of the clamping jaw 20 located opposite the rear portion 59 of the rake surface 58. Finally, whilst retaining partial abutment between the fourth abutment surface 64 of the bottom face 54 of the cutting insert 18 and the second abutment surface 42 of the second upper side 36 of the base jaw 22 along the abutment region R, the cutting insert 18 is rotated about the abutment region R until an acute angle is formed between the cutting insert 18 and the planar side surfaces 14a, 14b of the cutting portion 14 of the cutting tool 10, so that the top face 50 of the cutting insert 18 is located outside the insert pocket 16. Finally, the cutting insert 18 is removed from the insert pocket 16.

Attention is now drawn to FIG. 5 showing a key 72 for use in the insertion and removal of the cutting insert 18. The key 72 comprises a two-sided double-pronged portion 74 and a handle 76. The double-pronged portion 74 is provided on a first side 78 thereof with two parallel prongs, a first prong 78' and a second prong 78", spaced apart by a first distance and on a second side 80 thereof with a further two parallel prongs, a third prong 80' and a fourth prong 80", spaced apart by a second distance. The first distance being smaller than the second distance. The first and second prongs 78', 78" are used in step three of the cutting insert clamping process whilst the third and fourth prongs 80', 80" are used in step one of the cutting insert removal process.

In order to clamp the cutting insert 18 between the clamping jaw 20 and the base jaw 22 from the position shown in FIG. 4A the key 72 is positioned with the first prong 78' located in the first aperture 46 and the second prong 78" resting on the front side 35 of the base jaw 22 proximate the second upper side 36 thereof, with the handle 76 extending generally away from the cutting tool 10. The key 72 is now rotated so that the second prong 78" slides on the front side 35 of the base jaw 22 as it moves away from the second upper side 36 thereof, and the first prong 78' moves away from the rear portion 24 of the insert pocket 16 whilst abutting the rear face of the cutting insert 18 and applying a force thereto whereby the cutting insert 18 is rotated from the position shown in FIG. 4A to the position shown in FIG. 4B.

In order to unclamp the cutting insert 18 from the clamped position shown in FIG. 4B to the unclamped position shown in FIG. 4A, the key 72 is positioned with the third prong 80' located in the second aperture 47 and the fourth prong 80" resting on the front face 48 of the cutting insert 18, with the handle 76 extending generally away from the cutting tool 10. As the key 72 is now rotated about the third prong 80' the fourth prong 80" exerts a force to the front face 48 of the cutting insert 18, which as a result of which the cutting insert is rotated from the position shown in FIG. 4B to the position shown in FIG. 4A.

Attention is now drawn to FIGS. 6A and 6B, showing the mechanism for preventing lateral movement of the cutting insert 18 with respect to the cutting portion 14 of the cutting tool 10. In accordance with a preferred embodiment of the present invention, shown in FIG. 6A, the clamping surface 34 of the first lower side 32 of the clamping jaw 20 and the second upper side 36 (40, 42, 44) of the base jaw 22 have convex V-shaped cross-sections, and the second abutment surface 60 of the top face 50 and the bottom face 54 (62, 64, 66) of the cutting insert 18, have mating concave V-shaped cross-sectional surfaces. In accordance with another preferred embodiment of the present invention, shown in FIG. 6A, the clamping surface 34 of the first lower side 32 of the clamping jaw 20 and the second upper side 36 of the base jaw 22 have concave V-shaped cross-sections, and the second abutment surface 60 of the top face 50 and the bottom face 54 of the cutting insert 18, have mating convex V-shaped cross-sectional surfaces.

Figure 7:
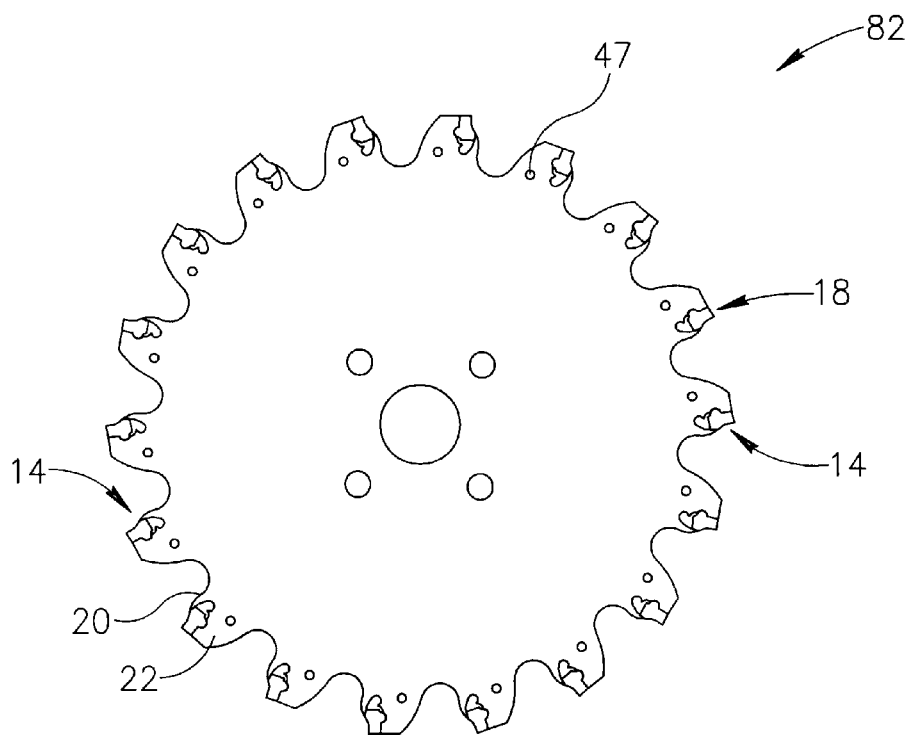
FIG. 7 is a side view of a rotary cutting tool having cutting portions in accordance with the present invention.
Figure 8:
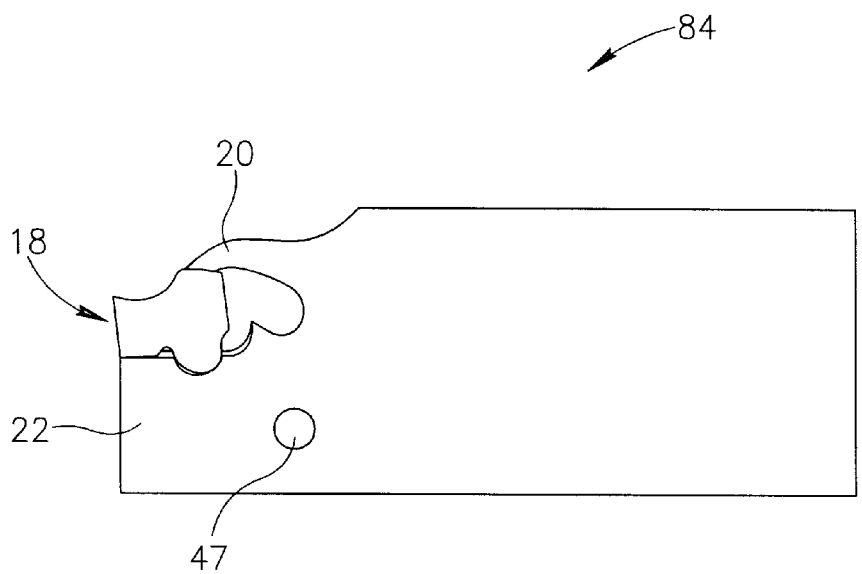
FIG. 8 is a side view of a holder blade having a cutting portion in accordance with the present invention.

FIG. 7 shows a rotary slot-cutting tool 82 with a plurality of cutting portions 14, arranged around the periphery of the tool. As described above the cutting inserts 18 are resiliently clamped between the clamping and base jaws 20, 22 of the cutting portions 14. FIG. 8 shows a holder blade 84, for cutting operations such as grooving and parting off, with a cutting insert 18 resiliently clamped between the clamping and base jaws 20, 22 thereof.

Although the present invention has been described to a certain degree of particularity, it should be understood that various alterations and modifications can be made without departing from the spirit or scope of the invention as hereinafter claimed.

What is claimed is:

1. A cutting tool comprising a body portion and at least one cutting portion, the at least one cutting portion comprising an insert pocket and a cutting insert removably retained therein;

the insert pocket being defined between a clamping jaw and a base jaw, the clamping jaw resiliently connected to the base jaw at a rear portion of the insert pocket; the insert pocket having an insert pocket opening at a front end thereof, the clamping jaw having a first upper side and a first lower side, the first lower side opposing the base jaw and being provided with a forward clamping surface proximate to the front end, the base jaw having a second upper side and a second lower side, the second upper side opposing the clamping jaw and comprising a generally straight first abutment surface proximate the front end connected to a second abutment surface having the form of a circular arc and forming a first recess in the base jaw relative to the first abutment surface;

the cutting insert comprising front and top faces that define a cutting edge at an intersection thereof, and a bottom face located between the front face and a rear face, the top face having a rake surface adjacent the cutting edge and a second abutment surface adjacent the rear face, the bottom face comprises a generally straight third abutment surface adjacent the front face and a fourth abutment surface adjacent the rear face, at least a portion of the fourth abutment surface having the form of a circular segment protruding from the cutting insert relative to the third abutment surface; wherein the first and second abutment surfaces abut the third and fourth abutment surfaces, respectively, and the clamping surface abuts the second abutment surface.

2. The cutting tool according to claim 1, wherein a first aperture is formed between the rear face of the cutting insert and the rear portion of the insert pocket.

3. The cutting tool according to claim 2, wherein a throughgoing second aperture is formed in the base jaw.

4. The cutting tool according to claim 3, wherein the cutting tool is a rotary cutting tool.

5. The cutting tool according to claim 3, wherein the cutting tool is a holder blade.

6. A method for inserting and clamping a cutting insert in an insert pocket, the insert pocket being defined between a clamping jaw and a base jaw, the clamping jaw resiliently connected to the base jaw at a rear portion of the insert pocket; the insert pocket having an insert pocket opening at a front end thereof, the clamping jaw having a first upper side and a first lower side, the first lower side opposing the base jaw and being provided with a forward clamping surface proximate to the front end, the base jaw having a second upper side and a second lower side, the second upper side opposing the clamping jaw and comprising a generally straight first abutment surface proximate the front end connected to a second abutment surface having the form of a circular arc and forming a first recess in the base jaw relative to the first abutment surface, the second abutment surface being located on a circle with a given center;

the cutting insert comprising front and top faces that define a cutting edge at an intersection thereof, and a bottom face located between the front face and a rear face, the top face having a rake surface adjacent the cutting edge and a second abutment surface adjacent the rear face, the bottom face comprises a generally straight third abutment surface adjacent the front face and a fourth abutment surface adjacent the rear face, at least a portion of the fourth abutment surface having the form of a circular segment protruding from the cutting insert relative to the third abutment surface;

the method comprising the steps of:
(i) partially inserting the cutting insert in the insert pocket from a side of the insert pocket by placing the fourth abutment of the bottom face of the cutting insert on the second abutment surface of the second upper side of the base jaw on an abutment region so that partial abutment is obtained between the fourth abutment surface and the second abutment surface, with the top face of the cutting insert located outside the insert pocket;
(ii) rotating the cutting insert about the abutment region into the insert pocket until the top face of the cutting insert is located inside the insert pocket, and the second abutment surface of the top face of the cutting insert is situated opposite the first lower side of the clamping jaw with the clamping surface of the first lower side of the clamping jaw located opposite the rear portion of the rake surface;
(iii) rotating the cutting insert in the insert pocket about the center of the circle on which the second abutment surface is located until the cutting insert is clamped in position with the third abutment surface of the bottom face of the cutting insert abutting the first abutment surface of the second upper side of the base jaw, the central portion of the fourth abutment surface of the bottom face of the cutting insert abutting the second abutment surface of the second upper side of the base jaw and the clamping surface of the first lower side of the clamping jaw abutting the second abutment surface of the top face of the cutting insert.

* * * * *